United States Patent [19]

Shank et al.

[11] Patent Number: 4,691,985
[45] Date of Patent: Sep. 8, 1987

[54] FIBER OPTIC CONNECTOR

[75] Inventors: Jeffrey B. Shank; Steve E. Swanson; Barry J. Opdahl, all of Williamsport, Pa.

[73] Assignee: GTE Products Corporation, Stamford, Conn.

[21] Appl. No.: 779,018

[22] Filed: Sep. 23, 1985

[51] Int. Cl.[4] ............................................. G02B 6/32
[52] U.S. Cl. ................................. 350/96.18; 350/96.20
[58] Field of Search ............... 350/96.18, 96.20, 96.21, 350/96.22

[56] References Cited

U.S. PATENT DOCUMENTS 4,124,364 11/1978 Dalgoutte .................... 350/96.21 X
4,147,402 4/1979 Chown ........................... 350/96.18
4,290,667 9/1981 Chown ........................... 350/96.18
4,421,383 12/1983 Carlsen .......................... 350/96.21
4,531,810 7/1985 Carlsen .......................... 350/96.20
4,593,969 6/1986 Goodman et al. ............... 350/96.20

Primary Examiner—William L. Sikes
Assistant Examiner—Frank González
Attorney, Agent, or Firm—William H. McNeill

[57] ABSTRACT

An optical fiber lens-connector assembly includes a plastic lens body joined to a connector of a low thermal expansion metal. The connector includes a glass capillary tube formed of a material (e.g., a borosilicate glass) having a substantially similar expansion coefficient. The assembly provides greater temperature stability when cycled over a wide temperature range.

6 Claims, 2 Drawing Figures

FIBER OPTIC CONNECTOR

TECHNICAL FIELD

This invention relates to connectors for optical fibers and more particularly to connectors for joining an optical fiber to an expanded beam lens.

BACKGROUND ART

Optical fibers are finding increasing use in telecommunications as well as in other data transmission systems because of their ability to carry vastly more information than equivalent sizes of electrical wire. Connecting two or more optical fibers, however, requires much more care than equivalent electrical connections since the fibers must be optically aligned. Many forms of optical connectors have been proposed to achieve the desired compatability of such connections; and include butt-to-butt joints of cleaved and polished fibers; and expanded beam lenses.

This invention is particularly concerned with improving the latter. Such expanded beam lense connectors are shown in U.S. Pat. No. 4,421,383. Connectors made in accordance with this patent have greatly advanced the art and function well within a temperature range of about 15° C. to 30° C. However, thermal cycling at temperature extremes, say, −40° C. to +60° C., has been shown to cause acrylic growth which creates a shift of position within the fiber-to-lens interface. This shift causes increased attenuation and, occassionally, complete failure.

DISCLOSURE OF THE INVENTION

It is, therefore, an object of this invention to obviate the disadvantages of the prior art.

It is another object of the invention to enhance fiber optic connectors.

Yet another object of the invention is the provision of an optical fiber connector which maintains functional integrity at temperature extremes.

These objects are accomplished, in one aspect of the invention, by the provisions of a connector for joining an optical fiber to an expanded beam lens. The connector comprises a generally cylindrical body having a longitudinal axis. The body is formed of a metallic material having a low thermal coefficient of expansion and has a first end, a second end, and an intermediate portion therebetween. The first end has a longitudinal cavity therein of a given diameter and the intermediate portion has a longitudinal cavity therein with a diameter less than the given diameter. A borosilicate glass tube having a longitudinal aperture therethrough is fitted into the cavity in the intermediate portion.

In use, the above-described connector is coupled with a lens body to form a lens-connector assembly. A lens body has a head end and a tail end of substantially cylindrical configuration. The tail end contains a cavity for receiving an elastomeric fiber holder; and the outer surface of the tail end fits into the cavity formed in the first end of the connector. An optical fiber is positioned in the borosilicate glass tube and penetrates the elastomeric fiber holder to abut against a functional surface of the lens body. The various parts are sealed together to form a unit.

The employment of low thermal expansion metal and glass prevents fiber movement at the lens-fiber interface. While acrylic growth of the lens still occurs, the lens-fiber interface remains constant, thus providing increased stability during temperature extremes.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

Figure 1:
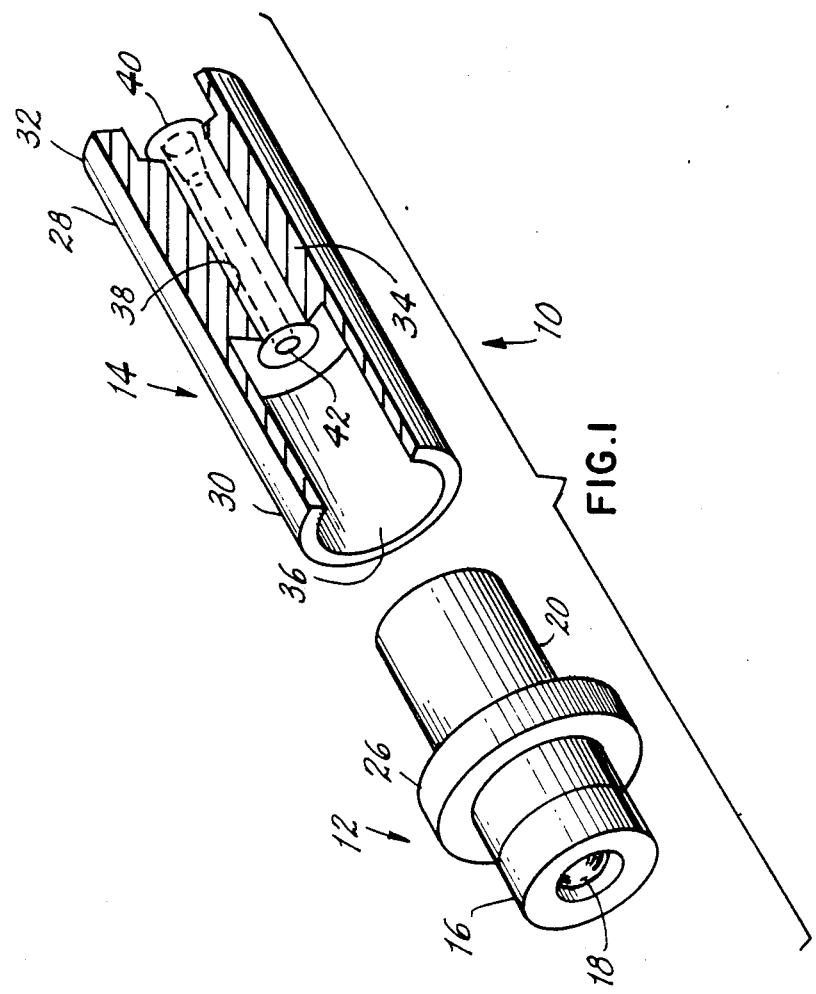
FIG. 1 is an exploded, perspective view of a lens-connector assembly.

Referring now to the drawings with greater particularity, there is shown in FIG. 1 an optical fiber lens-connector assembly 10 which comprises a lens body 12 and a connector 14. The lens body 12 is molded of optical quality plastic and can be of a design silimar to, and molded from the materials employed, with that shown in U.S. Pat. No. 4,421,383.

Figure 2:
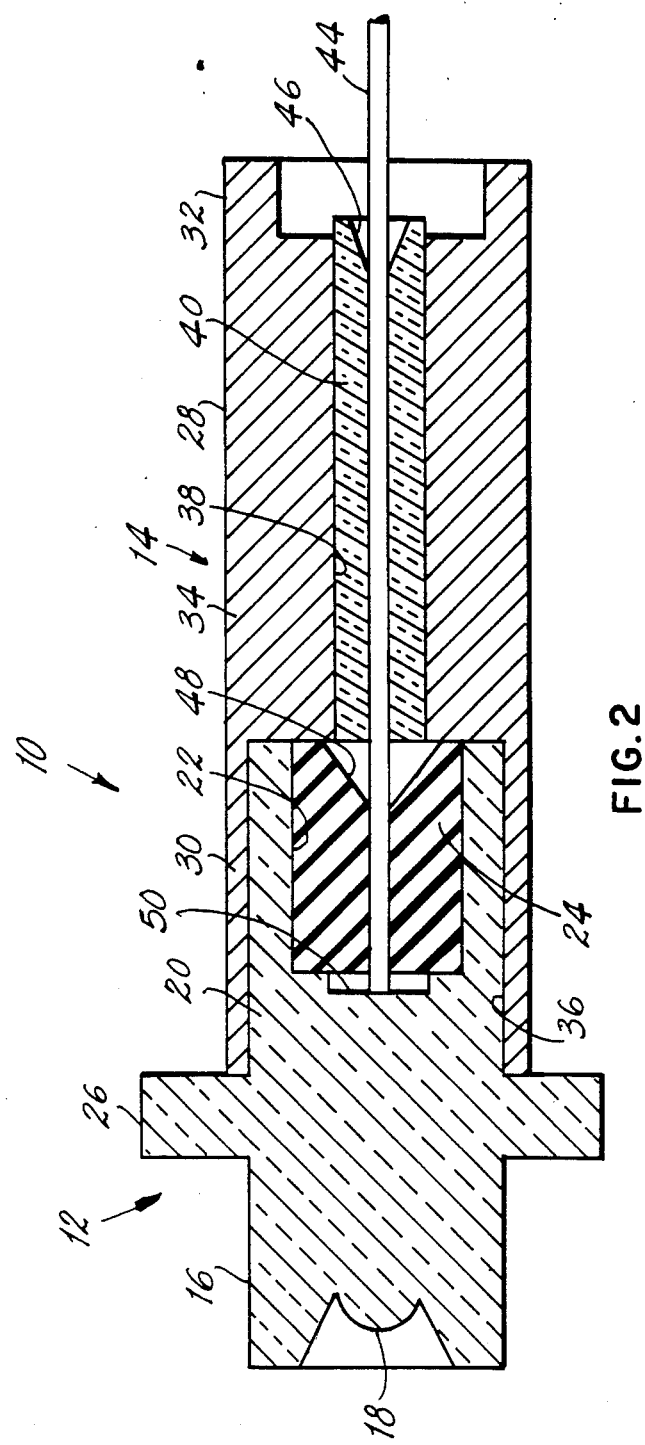
FIG. 2 is an elevational, sectional view of a lens-connector assembly with an optical fiber in place.

Body 12 has a head end 16 which includes a recessed lens 18 formed therein, and a tail end 20 of substantially cylindrical configuration. The tail end 20 contains an axial cavity 22 (FIG. 2) which contains an elastomeric fiber holder 24, which can be similar in principle to the elastomeric splices described in U.S. Pat. Nos. 4,257,674 or 4,325,607. A shoulder 26 is provided intermediate the head end 16 and the tail end 20 and projects radially outward from the lens body 12.

The connector 14 comprises a generally cylindrical body 28 having a longitudinal axis. The body 28 is formed of a metallic material having a low thermal expansion coefficient; i.e., a material having a thermal expansion coefficient of about $1.66 \times 10^{-6}/°$ C., between the temperature of 17° C. to 100° C. A suitable material is INVAR, an alloy comprised of 36% nickel, 0.35% manganese, with the balance iron.

Connector body 28 has a first end 30, a second end 32 and an intermediate portion 34 therebetween. The first end 30 has a longitudinal cavity 36 therein which has a given diameter sized to fittingly receive tail end 20 of lens body 12.

The intermediate portion 34 has a longitudinal cavity 38 therein which has a diameter less than the diameter of cavity 36 which receives a borosilicate glass tube 40 having a longitudinal aperture 42 therethrough. The aperture 42 is sized to receive an optical fiber 44 and can typically have a diameter of 0.0055 inches.

The borosilicate glass tube 40 can have a composition of $SiO_2$, 81%; $Al_2O_3$, 2%; $B_2O_3$, 13%; $Na_2O$, 4%, and a thermal expansion coefficient substantially matching that of connector body 28. Tube 40 is preferably bonded to connector body 28 by means of an ultraviolet sensitive adhesive, such as American Chemical & Engineering, Co., Lightweld 602.

The connector 14 is bonded to lens body 12 by the same adhesive to form the assembly 10.

When assembly 10 is completed, an optical fiber 44 is inserted through the aperture 42 in glass tube 40 (via conical portion 46), through the elastomeric fiber holder 24 (via conical portion 48) until it abuts the functional surface 50 formed in lens body 12. The optical fiber 44 is secured in place by an ultraviolet sensitive adhesive. The adhesive is applied via conical portion 46 and is drawn in around the fiber by capillary action. The light thruput is then optimized and the adhesive solidified by exposure to an ultraviolet source.

This assembly thus provides increased stability of the lens because of the low thermal expansion coefficients of the connector body 28 and the glass tube 40.

While there have been shown what are present considered to be the preferred forms of the invention, it will be apparent to those skilled in the art that various changes and modifications can be made herein without departing from the scope of the invention as defined by the appended claims.

We claim:

1. A connector for joining an optical fiber to an expanded beam lens, said connector comprising: a generally cylindrical body having a longitudinal axis, said body being formed of a metallic material having a low thermal expansion coefficient; said body having a first end, a second end, and an intermediate portion therebetween; said first end having a longitudinal cavity formed therein having a given diameter; said intermediate portion having a longitudinal cavity therein having a diameter less than said given diameter; and a borosilicate glass tube having a longitudinal aperture therethrough fitted into said longitudinal cavity in said intermediate portion.

2. The connector of claim 1 wherein said aperture in said glass tube has a diameter substantially identical to the diameter of an optical fiber.

3. The connector of claim 2 wherein said aperture has a diameter of about 0.0055 inches.

4. An optical fiber lens-connector assembly comprising: a lens body formed of transparent material, said lens body including a head end having a lens formed therein, a tail end of substantially cylindrical configuration having an axial cavity therein formed to receive an elastomeric fiber holder, and a shoulder formed intermediate said head end and said tail end and projecting radially outward from said lens body; and a connector for joining an optical fiber to said lens body, said connector comprising: a generally cylindrical body having a longitudinal axis, said body being formed of a metallic material having a low thermal expansion coefficient and having a first end, a second end, and an intermediate portion therebetween; said first end having a longitudinal cavity of a given diameter formed to fittingly receive said tail end of said lens body; said intermediate portion having a longitudinal cavity therein having a diameter less than said given diameter; and a borosilicate glass tube having a longitudinal aperture therethrough fitted into said longitudinal cavity in said intermediate portion.

5. The lens-connector assembly of claim 4 wherein an axially apertured elastomeric fiber holder is positioned in said tail end.

6. The lens-connector assembly of claim 5 wherein an optical fiber is positioned in said borosilicate glass tube and penetrates said elastomeric fiber holder to abut against a functional surface of said lens body.

* * * * *